June 28, 1966 V. J. KORKOWSKI ETAL 3,258,719
MULTIVIBRATOR WITH DIODES TO MAKE FREQUENCY INDEPENDENT OF SUPPLY VOLTAGE FLUCTUATIONS
Filed Nov. 24, 1964
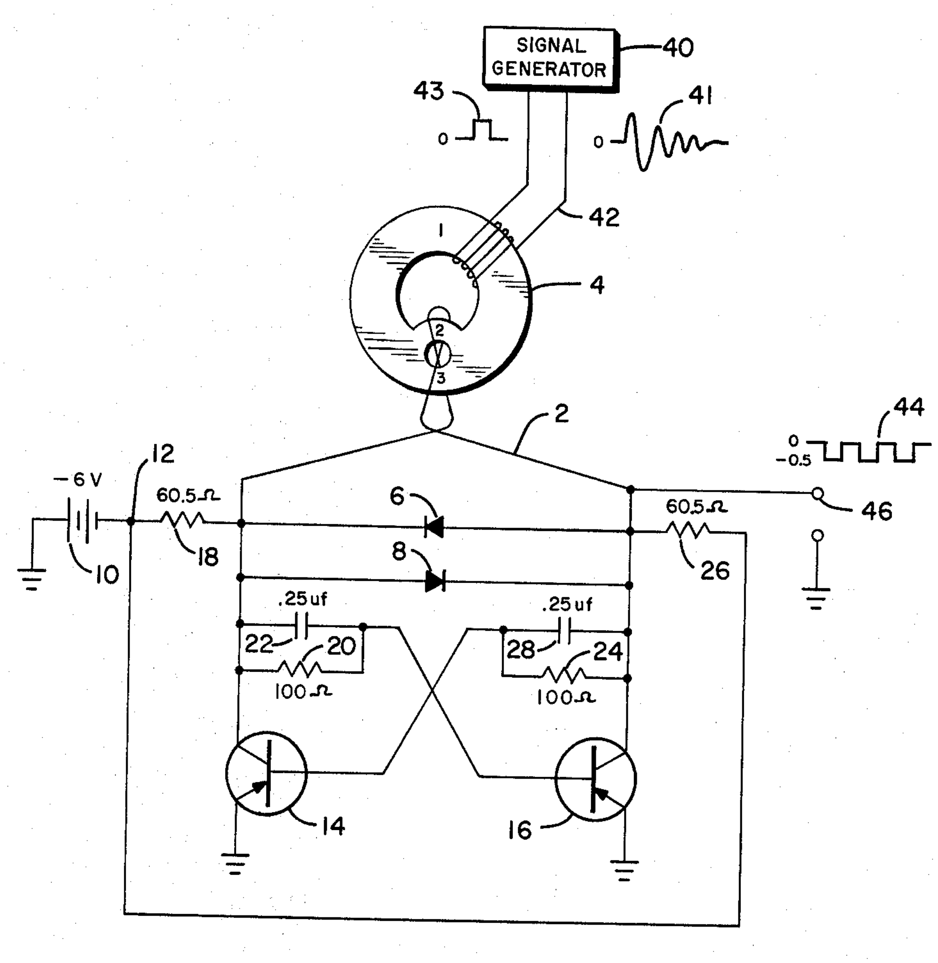
INVENTORS
VINCENT J. KORKOWSKI
PHILIP J. NISTLER
BY Thomas J. Nikolai
ATTORNEY

United States Patent Office 3,258,719

Patented June 28, 1966

3,258,719

MULTIVIBRATOR WITH DIODES TO MAKE FREQUENCY INDEPENDENT OF SUPPLY VOLTAGE FLUCTUATIONS

Vincent J. Korkowski, Minneapolis, and Philip J. Nistler, Bloomington, Minn., assignors to Sperry Rand Corporation, New York, N.Y., a corporation of Delaware Filed Nov. 24, 1964, Ser. No. 413,442
3 Claims. (Cl. 331—113)

This invention relates in general to oscillators and in particular to oscillators whose frequency is flux controlled and in particular to an oscillator whose frequency can be varied by a change in the level of the switchable flux about the small aperture of a transfluxor.

The use of transfluxors as memory and control elements is well known in the art. As a memory element the transfluxor provides nondestructive readout of a magnetic memory core; such operation is disclosed in the article "The Transfluxor," Rajchman and Lo, Proceedings of the IRE, March 1956, p. 321–332. This method utilizes a "transfluxor" that comprises a core of magnetizable material of a substantially rectangular hysteresis characteristic having at least a first large aperture and a second small aperture therethorugh. Information is stored in the magnetic sense of the flux about the large aperture with nondestructive readout of this stored information achieved by coupling an interrogate signal to an interrogate winding threading the small aperture. Readout of this stored information is achieved by switching the available flux about the small aperture. Interrogation of the transfluxor as described in the above article requires an unconditional reset current signal to be coupled to the small aperture to restore the magnetic state of the flux about the small aperture to its previous state if switched by the interrogate signal.

In such operation as a bistable device the flux about the small aperture is normally set into the "completely switched" state as compared to a "partially switched" state that is used for the sampling of an unknown signal's amplitude-duration characteristics—see the copending patent application of V. J. Korkowski, Ser. No. 352,524, filed March 17, 1964, assigned to the same assignee as is the present invention, for a detailed discussion of such methods of operation. Additionally, the degree of partial switching of flux about the small aperture has a functional relationship with the magnetomotive force used to set the magnetization into the particular partially switched state. Such magnetomotive force—flux state relationship can be utilized to establish, by a signal of the proper amplitude-duration characteristic, a means of achieving a remotely-settable, constant-frequency oscillator using the transfluxor's partially switching state as the frequency setting means. An excellent discussion of the use and theory of a transfluxor as a means of achieving a magnetic-electronic oscillator is given in the article entitled "Transfluxor Oscillator Gives Drift-Free Output" Richard J. Sherin, Electronics, March 4, 1960, p. 48–49. As such techniques are well known in the art no detailed discussion of such use and theory shall be needlessly repeated herein.

One serious deficiency in the control of the frequency of such magnetic-electronic oscillator as discussed in the above referenced electronics article is that the frequency is a function of the voltage of the switching signal applied across the winding coupling the small aperture of the transfluxor. Consequently, it is important that the switching signal be of a substantially constant voltage for a constant frequency output signal. The present invention is directed toward a means of obtaining a constant voltage across the winding that couples the electronic circuit to the magnetic circuit. This present invention involves the addition of two parallel-arranged, oppositely-poled diodes coupled across the winding linking the transfluxor's small aperture. The forward drop across the particular conducting diode is substantially constant and independent of supply and signal currents and voltages, and, consequently, provides an effective constant voltage switching signal to the flux about the transfluxor's small aperture. Thus, there is provided an improved transfluxor oscillator circuit whose output frequency is substantially independent of fluctuations in supply voltages.

Accordingly, it is a primary object of the present invention to provide an oscillator having an improved frequency regulation.

It is another object of the present invention to provide a transfluxor controlled oscillator circuit having an improved frequency regulation.

It is another object of the present invention to provide a constant voltage means across the winding coupling the minor aperture of a transfluxor controlled oscillator.

It is a further object of the present invention to provide a transfluxor frequency controlled oscillator whose output signals frequency is determined by the degree of partial switching of the transfluxors large aperture.

These and other more detailed and specific objects will be disclosed in the course of the following specification, reference being had to the accompanying drawing in which there is illustrated a preferred embodiment of the transfluxor-controlled astable multivibrator of the present invention.

The illustrated embodiment is that of an astable multivibrator that is essentially a nonsinusoidal two-stage oscillator in which one stage conducts while the other is cut off until a point is reached at which the stages reverse their operating conditions. That is, the stage that had been conducting cuts off, and the stage that had been cut off conducts. This oscillating process produces a square wave output. The oscillator of the preferred embodiment is basically a collector-coupled transistor multivibrator and is a two-stage resistance coupled common emitter amplifier with the output of the first stage coupled to the input of the second stage and the output of the second stage coupled to the input of the first stage. Since the signal in the collector circuit of a common-emitter amplifier is reversed in phase with respect to the input of that state, a portion of the output of each stage is fed to the other stage in phase with the signal on the base electrode. This regenerative feedback with amplification is required for oscillation. Bias and stabilization are established identically for both transistors.

With transfluxor 4 coupled to winding 2 and across the parallel coupled oppositely poled diodes 6 and 8 the oscillator frequency of the multivibrator of the illustrated embodiment is determined by the amount of the switchable flux about the small aperture linked by winding 2. Once the supply of voltage of −6.0 volts is coupled to terminal 12 either transistor 14 or 16 will proceed into saturation. Assume for explanatory purposes that transistor 14 is conducting more heavily than transistor 16 or that transistor 14 is conducting and transistor 16 is not conducting. With transistor 14 conducting the forward bias drop across diode 8 requires a constant voltage switch of the flux of the small aperture of transfluxor 4 by way of winding 2 switching the available flux thereabout around the aperture in a direction of the applied magnetomotive force. As the small aperture flux approaches saturation, the current through winding 2 sharply increases in an effort to maintain the constant voltage. However, the circuit parameters are chosen such that the peak current cannot increase to a sufficiently high amplitude to maintain the constant voltage switch of the small aperture; accordingly, the voltage thereabout will drop inducing degenerative feedback to transistor 14 causing the priorally conducting transistor 14 and nonconducting transistor 16 to interchange states. With transistor 16 now conducting the forward bias drop across diode 6 provides the constant voltage switch of the available flux about the small aperture to ward the condition of opposite saturation. As can be seen, the oscillator frequency is flux controlled and the frequency controlling factor is the amount of flux available to be switched about the small aperture. As is well known and as more fully discussed in the above referenced articles of Rajchman and Lo and Sherin and the above referenced patent application the amount of flux about the small aperture that is available to be switched by the alternating flow of current through winding 2 that is coupled to the small aperture of transfluxor 4 can be adjusted by coupling a proper signal to the large aperture of transfluxor 4, setting the flux in the large aperture in a more or less partially switched state so as to block less or more of the flux about the small aperture.

Prior to sampling the input signal for establishing the desired output signal frequency, the multivibrator is deactivated by a decoupling of battery 10 to terminal 12. Next, to preset transfluxor 4 into an initial preset state of substantial demagnetization, signal generator 40 couples a demagnetizing signal 41 to the large aperture of transfluxor 4 by way of winding 42. This demagnetizing signal may be a damped A.C. sinusoidal current which results in placing the flux about the large and small apertures of transfluxor 4 in alternately directed domains of magnetization effectively placing transfluxor 4 in a demagnetized, or 50% magnetic state. Next, signal generator 40 couples the input signal 43 of the appropriate amplitude-duration characteristic to the large aperture of transfluxor 4 by way of winding 42. This input signal is of the proper amplitude-duration characteristic to set the flux about the large aperture of transfluxor 4 in the desired partially switched state to establish the required output signal frequency. The partially switched flux about the large aperture of transfluxor 4 provides the corresponding partial blocking action of the flux about the small aperture of the transfluxor 4 as is well known. This corresponding partially blocked condition of the flux about the small aperture limits the flux about the small aperture that is available to be switched by the signal coupled from the multivibrator of transistors 14 and 16 through winding 2.

The operation of transfluxor 4 as a means of determining the frequency of oscillation of an astable multivibrator is well known in the art. However, prior art devices were subject to variations in frequency due to fluctuations in supply voltages and the saturation voltage of the transistors. As the voltage across the small aperture varied with change in supply voltage the current signal that generated the magnetomotive force that reversed the available flux about the small aperture varied accordingly. Consequently, the decreased (increased) voltage-decreased (increased) applied magnetomotive force relationship provided a correspondingly increase (decrease) in the switching time of the flux about the small aperture. By providing the parallel coupled-reverse poled diodes 6 and 8 across the collectors of transistors 14 and 16 there is provided across winding 2 a constant voltage source due to the constant small forward bias voltage drop across such diodes during their period of conduction. This constant voltage across winding 2 during the periods of forward biasing of diodes 6 and 8 by the oscillations of transistors 14 and 16 assures that there is coupled to output terminal 46 an output signal 44 whose frequency of oscillation is substantially independent of the supply voltage fluctuations.

In the illustrated embodiment transfluxor 4 was a type RCA XF–3006 and winding 2 coupled the small aperture with 10 turns and provided an output signal 44 of a settable frequency of oscillation of 10–20 kc.

It is understood that suitable modifications may be made in the structure as diclosed provided such modifications come within the spirit and scope of the appended claims. Having now, therefore, fully illustrated and described our invention, what we claim to be new and desire to protect by Letters Patent is:

1. An astable multivibrator having an oscillation frequency remotely settable by the setting of flux about the small aperture of a transfluxor into a corresponding blocked flux level, comprising:

a transfluxor having a first large aperture and a second small aperture, said apertures defining three flux paths, a first flux path defined by the periphery of the first aperture, a second flux path defined by the periphery of the second aperture and a third flux path defined by a path common to both of said first and second apertures;

signal generator means coupled to said first flux path;

an astable multivibrator including two similar conductivity type transistors, each of said transistors having a base electrode, an emitter electrode and a collector electrode;

first winding means coupled across the collector electrodes of said first and second transistors and coupled to said second flux path;

means coupling the collector electrodes of said first and second transistors, respectively, to a source of reference potential;

first and second unidirectional conducting means coupled in a parallel-arranged and oppositely-poled manner across the collector electrodes of said first and second transistors for providing a substantially constant voltage across said first winding means during their respective conducting periods;

said signal generator coupling a pulse type input signal to said first flux path for setting said transfluxor into a blocked flux level corresponding to the amplitude-duration characteristic of said input signal for establishing an oscillation frequency level of said coupled astable multivibrator that corresponds to said blocked state level.

2. An astable multivibrator having an oscillation frequency remotely settable by the setting of the flux about the small aperture of a transfluxor into a corresponding blocked flux level, comprising:

a transfluxor having a first large aperture and a second small aperture, said apertures defining three flux paths, a first flux path defined by the periphery of the first aperture, a second flux path defined by the periphery of the second aperture and a third flux path defined by a path common to both of said first and second apertures;

first winding means coupled to said first flux path;

signal generator means coupled to said first flux path by said first winding means;

an astable multivibrator including two similar conductivity type transistors, each of said transistors having a base electrode, an emitter electrode and a collector electrode;

second winding means coupled across the collector electrodes of said first and second transistors and coupled to said second flux path in the same clockwise magnetic flux sense about said second aperture;

first and second resistor means coupling the collector electrodes of said first and second transistors, respectively, to a source of reference potential;

first and second unidirectional conducting means coupled in a parallel-arranged and oppositely-poled manner across the collector electrodes of said first and second transistors for providing a substantially constant voltage across said first winding means during their respective conducting periods;

said signal generator means coupling an initial demagnetizing signal to said first flux path for setting said transfluxor into an initial substantially demagnetized state establishing the minimum oscillation frequency level of said coupled astable multivibrator;

said signal generator subsequently coupling a pulse type input signal to said first flux path for setting said transfluxor into a blocked flux level corresponding to the amplitude-duration characteristic of said input signal for establishing an oscillation frequency level of said coupled astable multivibrator that corresponds to said blocked state level.

3. An astable multivibrator having an oscillation frequency remotely settable by the setting of the flux about the small aperture of a transfluxor into a corresponding blocked flux level, comprising:

a transfluxor having a first large aperture and a second small aperture, said apertures defining three flux paths, a first flux path defined by the periphery of the first aperture, a second flux path defined by the periphery of the second aperture and a third flux path defined by a path common to both of said first and second apertures;

first winding means coupled to said first flux path;

signal generator means coupled to said first flux path by said first winding means;

an astable multivibrator including two similar conductivity type transistors, each of said transistors having a base electrode, an emitter electrode and a collector electrode;

the base electrode of each of said transistors separately coupled to the collector electrode of the other transistor by a parallel arranged RC circuit;

second winding means coupled across the collector electrodes of said first and second transistors and coupled to opposite portions of said second flux path in the same clockwise magnetic flux sense about said second aperture;

output means coupled to the collector electrode of one of said transistors;

first and second resistor means coupling the collector electrodes of said first and second transistors, respectively, to a source of reference potential;

first and second unidirectional conducting means coupled in a parallel-arranged and oppositely-poled manner across the collector electrodes of said first and second transistors, said first and second unidirectional conducting means providing a substantially constant voltage across said first winding means during their respective conducting periods;

said signal generator means coupling an initial demagnetizing signal to said first flux path for setting said transfluxor into an initial substantially demagnetized state establishing the minimum oscillation frequency level of said coupled astable multivibrator;

said signal generator subsequently coupling a pulse type input signal to said first flux path for setting said transfluxor into a blocked flux level corresponding to the amplitude-duration characteristic of said input signal for establishing an oscillation frequency level of said coupled astable multivibrator that corresponds to said blocked state level.

No references cited.

ROY LAKE, *Primary Examiner.*

J. KOMINSKI, *Assistant Examiner.*